(12) United States Patent
Perrone

(10) Patent No.: US 7,536,945 B2
(45) Date of Patent: May 26, 2009

(54) PISTON PIN FOR A COMBUSTION ENGINE AND METHOD FOR ITS MANUFACTURE

(75) Inventor: Luiz Perrone, Ann Arbor, MI (US)

(73) Assignees: MAHLE Technology, Inc., Farmington Hills, MI (US); MAHLE International GmbH, Stuugart (DE)

( * ) Notice: Subject to any disclaimer, the term of this patent is extended or adjusted under 35 U.S.C. 154(b) by 273 days.

(21) Appl. No.: 11/648,396

(22) Filed: Dec. 29, 2006

(65) Prior Publication Data

US 2008/0156185 A1    Jul. 3, 2008

(51) Int. Cl.
    F16J 1/16    (2006.01)
    F02F 3/26    (2006.01)
(52) U.S. Cl. .................. 92/155; 92/187; 29/888.05
(58) Field of Classification Search ............ 92/153, 92/155, 187, 223; 29/888.05
    See application file for complete search history.

(56) References Cited

U.S. PATENT DOCUMENTS

| | | | |
|---|---|---|---|
| 4,406,558 A * | 9/1983 | Kochendorfer et al. | 92/187 |
| 4,430,906 A * | 2/1984 | Holtzberg et al. | 92/187 |
| 5,255,592 A * | 10/1993 | Lewis, Jr. | 29/888.05 |
| 5,327,813 A * | 7/1994 | DeBell et al. | 92/187 |
| 6,273,612 B1 * | 8/2001 | Ono et al. | 384/276 |
| 6,557,457 B1 * | 5/2003 | Hart et al. | 92/223 |
| 6,863,922 B2 * | 3/2005 | Ogihara et al. | 427/190 |
| 7,228,786 B2 * | 6/2007 | Hamada et al. | 92/187 |

FOREIGN PATENT DOCUMENTS

| | | |
|---|---|---|
| DE | 41 11 368 | 1/1992 |
| DE | 198 24 859 | 12/1999 |
| JP | 03202175 | 9/1991 |
| WO | WO96/07841 | 3/1996 |
| WO | WO2005/042953 | 5/2005 |

* cited by examiner

*Primary Examiner*—Thomas E Lazo
(74) *Attorney, Agent, or Firm*—Collard & Roe, P.C.

(57) ABSTRACT

A piston pin for connecting the small connecting rod eye of a connecting rod to a piston of a combustion engine and a method for manufacturing the piston pin. The piston has boss bores aligned with the small connecting rod eye for receiving the piston pin. The surface of the piston pin is provided with a coating comprising a resin containing suspended solid lubricant particles.

7 Claims, 4 Drawing Sheets

PISTON PIN FOR A COMBUSTION ENGINE AND METHOD FOR ITS MANUFACTURE

BACKGROUND OF THE INVENTION

1. Field of the Invention

The present invention relates to a piston pin and method for connecting the small connecting rod eye of a connecting rod to a piston of a combustion engine. The piston has boss bores aligned with the small connecting rod eye for receiving the piston pin.

2. The Prior Art

The piston pin connects a connecting rod to the piston of a combustion engine, where the connecting rod in turn connects the piston to the crankshaft. The connecting rod is provided with a small connecting rod eye and with a large connecting rod eye. The small connecting rod eye receives the piston pin, while the large one encloses a crankpin. The small connecting rod eye is arranged aligned with boss bores in pin bosses on the piston. The piston pin is mounted in the boss bores and passes through the small connecting rod eye. The pin bosses and the connecting rod eyes are among the most highly stressed parts of a piston, since the piston pin can not only bend during the oscillating movement of the piston due to the enormous forces acting on the piston, but also rub inside the boss bores and the small connecting rod eye.

SUMMARY OF THE INVENTION

It is therefore an object of the present invention to provide a piston pin that reduces the risk of seizure in the boss bores or in the small connecting rod eye.

It is a further object of the present invention to provide a method for manufacturing a piston pin of this type.

These objects are accomplished according to the invention by a piston pin and a method for making the pin, in which a coating comprising a resin containing suspended solid lubricant particles is applied to the surface of the piston pin.

The present invention provides piston pins in a simple manner with a coating that prevents or at least reduces friction in the boss bores and the small connecting rod eye. The coating can be applied without prior application of an adhesive coat. The required dimensional accuracy is dependably attained. The durability and hence the service life of the piston pin and of its mounting in the boss bores and in the small connecting rod eye are considerably improved as a result of the better lubrication properties.

In one embodiment, at least one oil collection area can be provided in the coating in order to improve the lubrication of the mounting still further and to absorb impurities in the form of small particles. The oil collection area can for example be designed as an oil groove running in a wave form in the direction of the longitudinal axis of the pin.

The minimum thickness of the coating depends on the requirements of the specific case and can for example be from 5 µm to 15 µm. The resin contained in the coating is preferably a thermally set resin, in particular a polyamidimide resin that is very temperature-resistant and can withstand the strains to which the mounting is subjected during operation.

A proportion of 50% by weight to 60% by weight of solid lubricant particles in the coating provides particularly advantageous lubrication properties. The solid lubricant particles can here comprise graphite, molybdenum sulphide, tungsten sulphide, hexagonal boron nitride or PTFE (polytetrafluoroethylene). The solid lubricant particles preferably consist of only one material. It is particularly favorable when all solid lubricant particles comprise the same material, or when solid lubricant particles are mixed that comprise two different materials, for example solid lubricant particles of graphite are mixed with solid lubricant particles from a metal sulphide. For a particularly effective lubrication, the solid lubricant particles have a particle size of 1 µm to 3 µm.

The method according to the invention can be implemented as a screen printing method or as a spraying or atomizing method. A rotating atomization method is particularly suitable.

The coating means can in particular be applied to a surface of the piston pin with a surface roughness of Ra (mean roughness value) of ≦0.8 m in order to achieve a particularly good adhesion. To further improve the adhesion of the coating on the surface of the piston pin, the surface of the piston pin can be preheated before and/or during the application of the coating, preferably up to a temperature of 50° C. to 80° C.

A preferred embodiment of the method according to the invention comprises the use of a thermally settable coating and the subjecting of the coating to heat treatment directly after completion of application, preferably at a temperature of 200° C.

The surface of the piston pin can be phosphated prior to application of the coating in order to further improve the adhesion of the coating to the surface.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
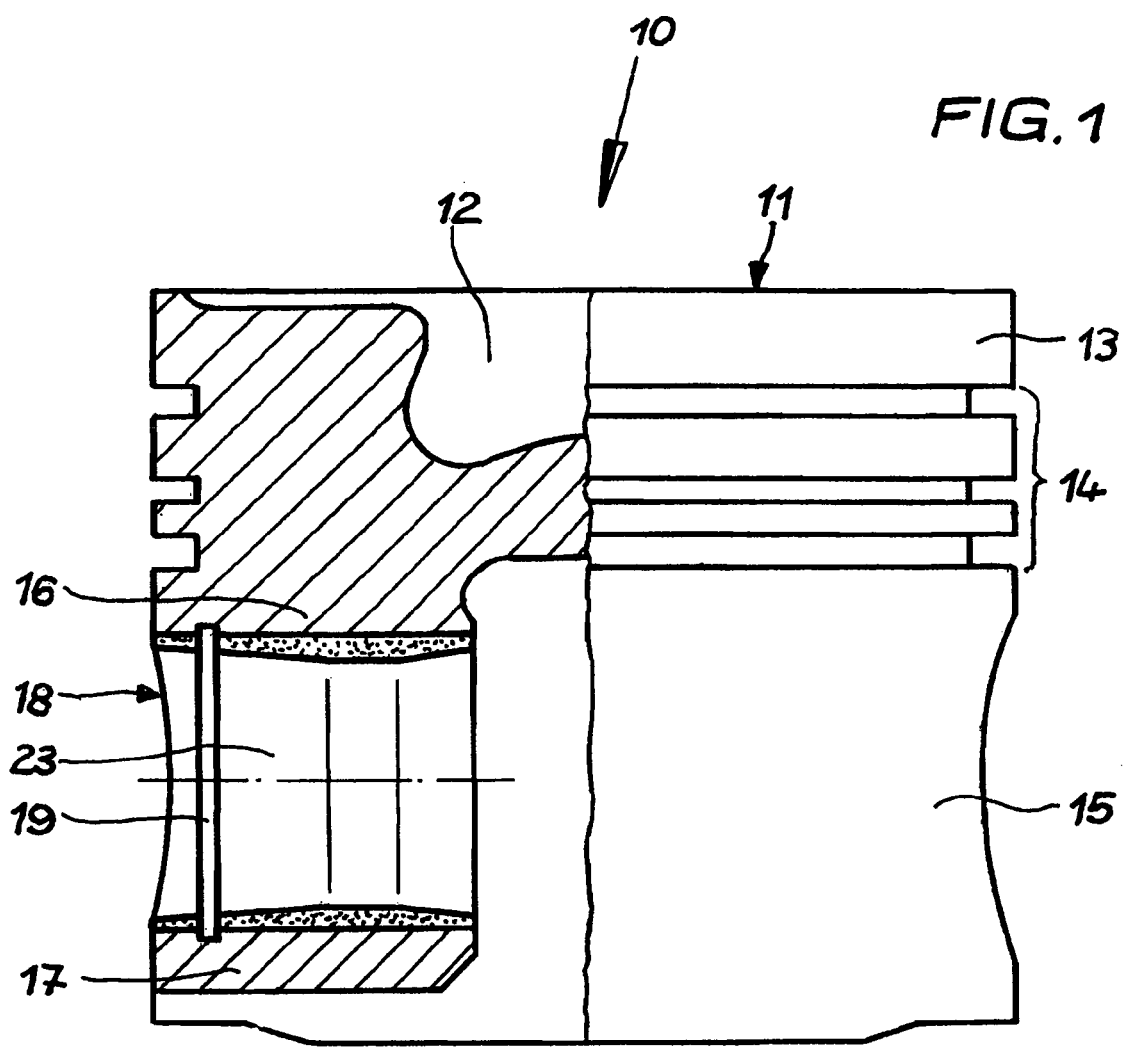
FIG. 1 shows a partial section through a piston.

Referring now in detail to the drawings, FIG. 1 shows as an example a piston 10 that can be provided with a piston pin according to the invention. A single-part piston 10 was selected as a non-limiting example. Piston 10 comprises steel or a light metal alloy, for example, in a known manner. Piston 10 has a piston head 11 with a combustion bowl 12 and an annular and all-round side wall with a top land 13 and a ring belt 14 for receiving piston rings, not shown. Piston 10 furthermore has a piston skirt 15 underneath piston head 11. Piston skirt 15 has two boss connections 16 supported on the underside of piston head 11 and merging into two piston bosses 17. Piston bosses 17 enclose a cavity 21. Each piston boss is provided with a boss bore 18 equipped with a securing annular groove 19 for a piston ring (not shown). Depending on the design of the piston (two or more parts), it is of course also possible to provide more than two piston bosses with appropriate boss bores.

Boss bores 18 in the embodiment are if necessary coated shaped bores with a defined inner contour 23 differing from the cylindrical form, as disclosed in International Application WO 96/07841 A1, for example. This design is intended to relieve the strain on the piston pin during operation and hence prevent the risk of incipient cracking in the bosses. Other designs for a boss bore that serve the same purpose are for example boss bores with an oval shape (high and/or transverse oval) or with strain relief wells (not shown). These designs are known per se.

Figure 2:
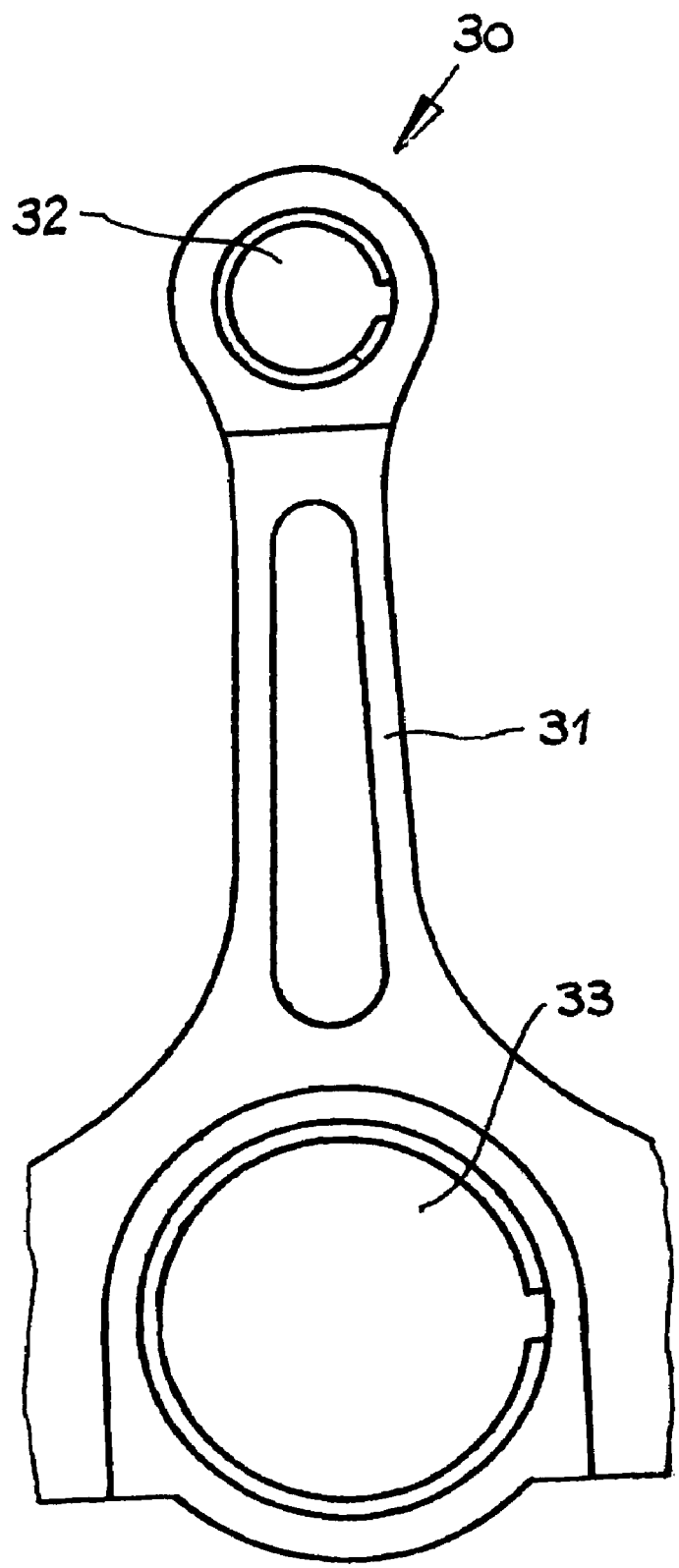
FIG. 2 shows a front view of a connecting rod.

FIG. 2 shows a connecting rod 30 as an example. Connecting rod 30 comprises steel, for example, and has a connecting rod shank 31, a small connecting rod eye 32 and a large connecting rod eye 33. Large connecting rod eye 33 receives a crankpin of a crankshaft (not shown), while small connecting rod eye 32 receives the piston pin of a piston 10 (not shown). To do so, the small connecting rod eye is arranged aligned with the boss bores 18 of piston 10 in cavity 21 enclosed by piston bosses 17.

Connecting rod eyes 32, 33 can, as shown in the embodiment, also if necessary be coated shaped bores with a defined inner contour differing from the cylindrical form, as disclosed for boss bores in WO 96/07841 A1, for example. This design relieves the strain on the mechanical system comprising piston pin, connecting rod 30 and crankpin during operation, to prevent the risk of incipient cracks around the connecting rod eyes 32, 33. Other designs for connecting rod eyes that serve the same purpose are for example bores provided with an oval shape (high and/or transverse oval) or with strain relief wells (not shown). These designs are known per se.

Figure 3:
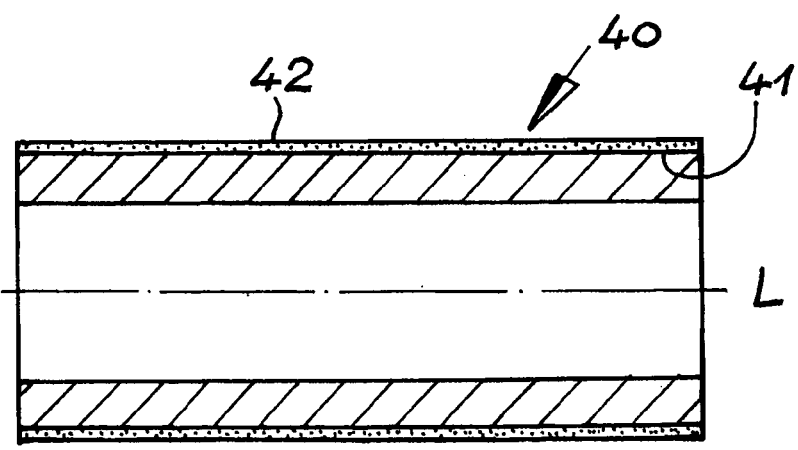
FIG. 3 shows a section through a piston pin according to an embodiment of the invention.

FIG. 3 shows an embodiment of a piston pin 40 according to the invention, and how it can interact for example with a piston 10 and a connecting rod 30. Piston pin 40 comprises for example steel and is designed as a hollow cylinder. It is provided with a coating 42 along its surface 41. Coating 42 substantially comprises a resin containing suspended solid lubricant particles and is hence a self-lubricating coating.

Figure 4:
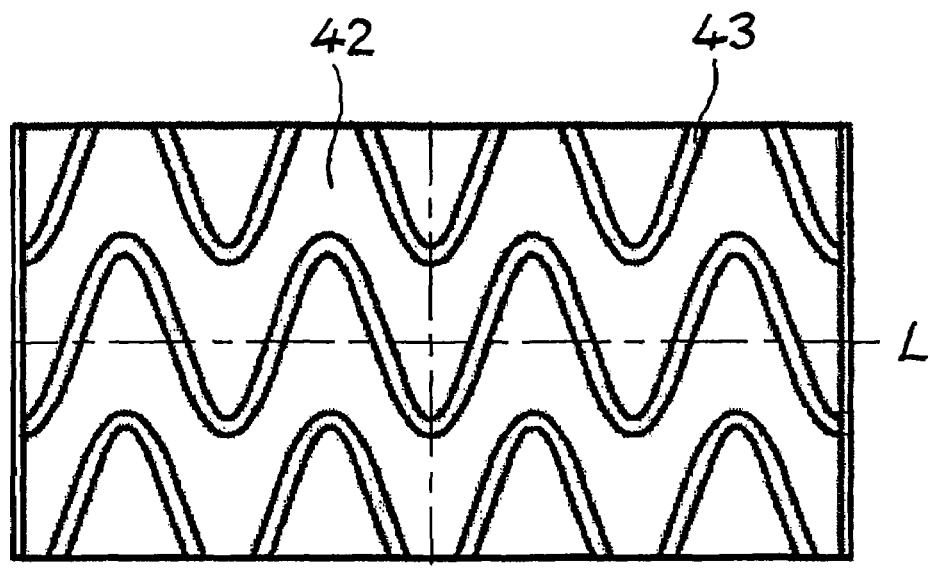
FIG. 4 shows a geometrical view of oil grooves in a coating according to an embodiment of the invention.
Figure 5:
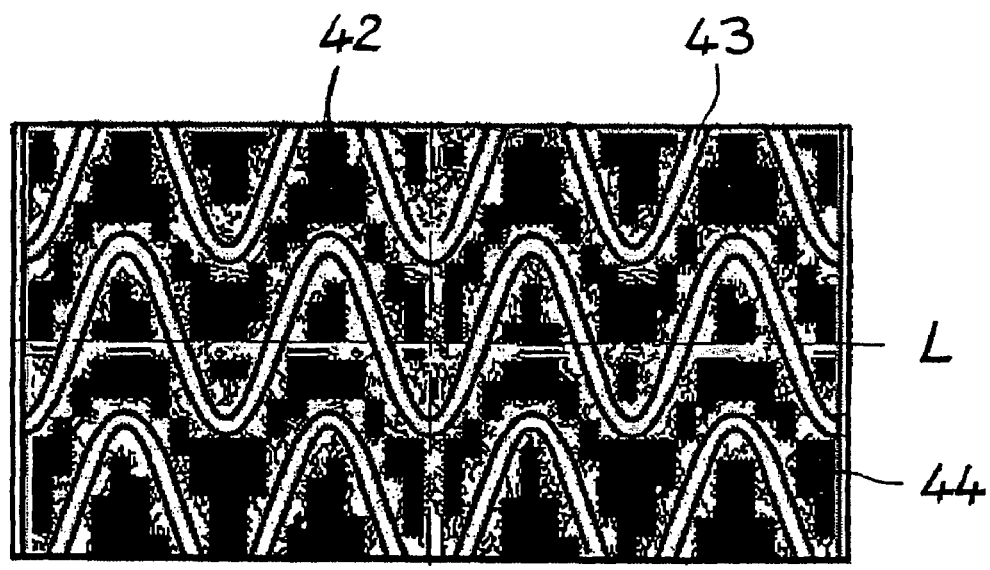
FIG. 5 shows a front view of the coating in accordance with an embodiment of the invention and according to FIG. 4 including the coating.

In the embodiment, coating 42 is furthermore provided with oil collection areas in the form of oil grooves 43 extending in wave form in the direction of longitudinal axis L of piston pin 40, as shown in FIGS. 4 and 5. These oil collection areas are used to further improve the lubrication of the respective mounting of piston pin 40 inside the small connecting rod eye 32 or in boss bore 18 and to receive impurities in the form of small particles. They can of course be designed in any size and shape for every required application and arranged in any configuration required.

For manufacture of a piston pin 40, first surface 41 of the hollow cylinders is finish-machined in the known fashion. The surface roughness Ra (mean roughness value) can be equal to that specified in German Patent No. DE 41 11 368 A1, where generally speaking the Ra values are 0.63 μm or less for external diameters of less than 30 mm and Ra values of 0.8 μm or less are achieved for external diameters between 30 and 60 mm. The external diameter in the embodiment is selected prior to coating such that finished piston pin 40 in small connecting rod eye 32 or in each boss bore 18 is provided with a diametral play of 10 μm to 40 μm. The surface 41 of the hollow cylinder should be cleaned so that chips, other particles, machining oils and the like are completely removed. The surface 41 can be phosphated in a manner known per se prior to coating, in order to further improve the adhesion of coating 42 on surface 41.

Coating 42 in accordance with the invention can be applied to surface 41 using screen printing methods, as is known from for example German Patent No. DE 198 24 859 A1, Japanese Patent No. JP03202175 A or International Application WO 2005/042953 for the coating of piston skirts. Coating 42 in accordance with the invention can however also be applied by spraying or atomizing. If additional oil collection areas, for example in the form of oil grooves 43, are to be provided, suitable masking templates are placed on surface 41 in a known manner during spraying or atomizing before the coating 42. The masking templates prevent the coating of the covered areas of surface 41. As an alternative, the finished coating 42 can be reworked and provided in this manner with oil collection areas.

The coating selected in the embodiment is formed from a thermally settable resin containing suspended solid lubricant particles of one or more of the materials graphite, molybdenum sulphide, tungsten sulphide, hexagonal boron nitride and PTFE. In the embodiment, the resin is a very temperature-resistant polyamidimide, and the solid lubricant is a mixture of molybdenum sulphide and graphite particles with a particle size of 1 μm to 3 μm. The quantity of solid lubricant is selected in the embodiment such that the finished coating contains around 50 to 60% by weight of solid lubricant particles. The viscosity of the coating means is set such that dripping is avoided with sufficient application. A coating means of this type is known under the trade name of Grafal®.

For application of coating 42 in accordance with the invention onto surface 41 of piston pin 40, a standard screen printing device, for example, as known from German Patent No. DE 198 24 859 A1, Japanese Patent No. JP03202175 A or International Application WO 2005/042953 for the coating of piston skirts is used, for example.

Figure 6:
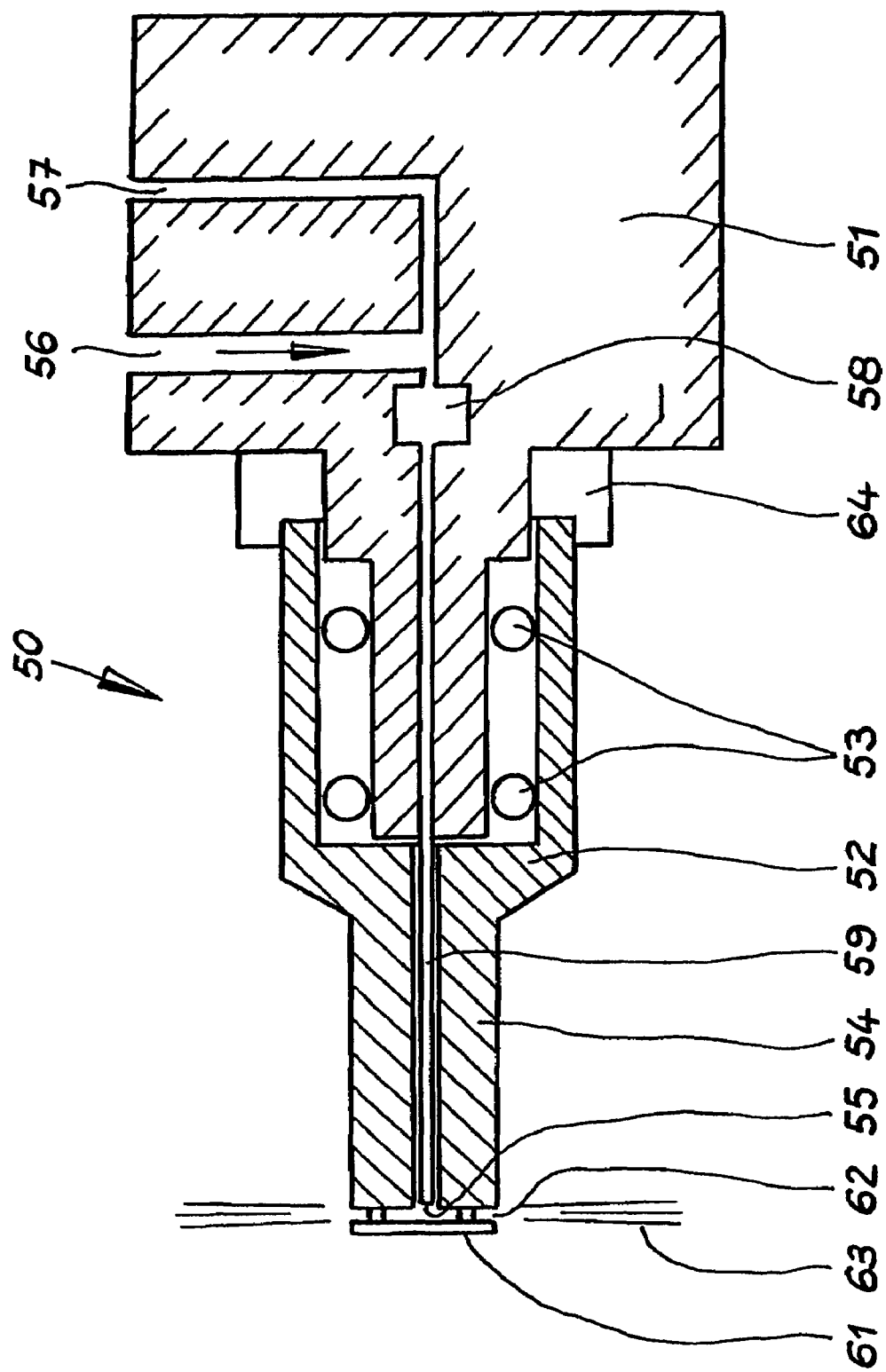
FIG. 6 shows a schematic view of a coating tool.

Coating 42 can be applied by spraying or atomizing by rotating atomization. FIG. 6 shows a device 50 for rotating atomization that is suitable for this purpose. Device 50 has a basic element 51 that is connected to a nozzle element 52. Nozzle element 52 is rotatably mounted on the basic element by a bearing 53. Nozzle element 52 has a nozzle 54 having an outlet aperture 55. Basic element 51 has supply ducts 56, 57 intended for the liquid coating material and for compressed air respectively and ending in a mixing chamber 58 for mixing and metering. From mixing chamber 58, an outlet duct 59 extends through nozzle element 52 and ends in outlet aperture 55. A baffle plate 61 is arranged vertically to outlet aperture 55 such that an annular gap 62 with a width of 0.5 mm is obtained in the embodiment between baffle plate 61 and nozzle element 52. The coating means/air mixture exits radially in the form of a spray jet 63 through gap 62 and at a distance from nozzle element 52.

Nozzle element 52 is set into rotation by a drive 64 and in the embodiment rotates in the speed range between 14,000 and 18,000 revolutions per minute. The coating means/air mixture exiting from outlet aperture 55 is accelerated by the centrifugal forces generated at outlet aperture 55 such that it exits radially as a fan-like spray jet 63. Since spray jet 63 in the direction of the longitudinal axis L is narrow, coating 41 of piston pin 40 can be exactly limited in the direction of longitudinal axis L by a simple feed control of the coating means/air mixture. In the embodiment, nozzles 54 with a diameter in the range between 5 and 25 mm and with depths of up to 50 mm are available, so that device 50 can be used to coat piston pins 40 for all engine types. The diameter of nozzle 54 is as a rule selected such that it corresponds to around half the external diameter of piston pin 40.

For performance of the coating process, a centrifugal apparatus S-520 made by Sprimag, Kirchheim/Germany is suitable.

The coating means/air mixture is applied in the embodiment to surface 41, preheated to 50° C. to 80° C., of piston pin 40. If required, the quantity of the coating means/air mixture exiting from outlet aperture 55 of nozzle 54 can be varied. It is expedient here that device 50 operates under computer control.

When the coating is applied, it is thermally set by placing piston pin 40 in a furnace and keeping it there for between 10 and 20 minutes at a temperature of 200° C.

Finished coating 42 is around 5 μm to 20 μm thick and the diametral play of piston pin 40 in small connecting rod eye 32 or in boss bores 18 is from around 10 μm to 20 μm. This narrow play is particularly advantageous for avoiding noise. Coating 42 furthermore assures that despite the narrow play no seizures occur.

Accordingly, while only a few embodiments of the present invention have been shown and described, it is obvious that many changes and modifications may be made thereunto without departing from the spirit and scope of the invention.

What is claimed is:

1. A piston pin for connecting a small connecting rod eye of a connecting rod to a piston of a combustion engine, the piston having boss bores aligned with the small connecting rod eye for receiving the piston pin, wherein a surface of the piston pin is coated with a coating comprising a resin containing suspended solid lubricant particles, and further comprising at least one oil collection area in the coating.

2. A piston pin according to claim 1, wherein the at least one oil collection area is designed as an oil groove running in a wave form in a direction of a longitudinal axis of the pin.

3. A piston pin according to claim 1, wherein the coating has a minimum thickness of from 5 μm to 20 μm.

4. A piston pin according to claim 1, wherein the resin is a thermally set resin.

5. A piston pin for connecting a small connecting rod eye of a connecting rod to a piston of a combustion engine, the piston having boss bores aligned with the small connecting rod eye for receiving the piston pin, wherein a surface of the piston pin is coated with a coating comprising a resin containing suspended solid lubricant particles and wherein the coating contains 50 to 60% by weight of solid lubricant particles.

6. A piston pin according to claim 1, wherein the solid lubricant particles comprise a material selected from the group consisting of graphite, molybdenum sulphide, tungsten sulphide, hexagonal boron nitride and PTFE (polytetrafluoroethylene).

7. A Piston pin for connecting a small connecting rod eye of a connecting rod to a piston of a combustion engine, the piston having boss bores aligned with the small connecting rod eye for receiving the piston pin, wherein a surface of the piston pin is coated with a coating comprising a resin containing suspended solid lubricant particles, and wherein the solid lubricant particles have a particle size from 1 μm to 3 μm.

* * * * *